(12) United States Patent
Piroard (10) Patent No.: US 12,418,959 B2
(45) Date of Patent: Sep. 16, 2025

(54) METHOD FOR INITIATING COMMUNICATION WITHIN A REGROUP OF COMMUNICATION GROUPS IN A 3GPP MCS NETWORK

(71) Applicant: AIRBUS DS SLC, Elancourt (FR)

(72) Inventor: François Piroard, Elancourt (FR)

(73) Assignee: AIRBUS DS SLC, Elancourt (FR)

( * ) Notice: Subject to any disclaimer, the term of this patent is extended or adjusted under 35 U.S.C. 154(b) by 453 days.

(21) Appl. No.: 18/090,642

(22) Filed: Dec. 29, 2022

(65) Prior Publication Data

US 2023/0217543 A1 Jul. 6, 2023

(30) Foreign Application Priority Data

Dec. 30, 2021 (FR) ..................................... 2114662

(51) Int. Cl.
*H04W 76/40* (2018.01)
*H04L 65/1104* (2022.01)
*H04W 88/16* (2009.01)

(52) U.S. Cl.
CPC ......... *H04W 76/40* (2018.02); *H04L 65/1104* (2022.05); *H04W 88/16* (2013.01)

(58) Field of Classification Search
CPC .... H04W 76/40; H04W 88/16; H04L 65/1104
See application file for complete search history.

(56) References Cited

U.S. PATENT DOCUMENTS

2020/0120454 A1* 4/2020 Gundur .............. H04L 65/1016
2021/0044937 A1 2/2021 Paterour et al.

FOREIGN PATENT DOCUMENTS

EP 3 731 544 A1 10/2020

OTHER PUBLICATIONS

Search Report as issued in French Patent Application No. FR2114662, dated Jul. 18, 2022.
LTE; Mission Critical (MC) services over LTE; Part 1: Common test environment (3GPP Ts 36.579-1 version 15.3.1 Release 15); ETSI Technical Specification, vol. 3GPP, No. V15.3.1, Oct. 2021, XP014417409, Retrieved from the Internet: URL:http://www.etsi. org/deliver/etsi_ts/136500_136599/13657901/15.03.01_60/ts_1365790lv150301p.pdf, [retrieved on Oct. 21, 2021], 549 pages.

(Continued)

*Primary Examiner* — Myron Wyche
(74) *Attorney, Agent, or Firm* — Pillsbury Winthrop Shaw Pittman LLP (57) ABSTRACT

A method for initiating a communication within a regroup of communication groups, the method being implemented by a network according to the 3GPP MCS standard including at least two systems separated by a gateway hiding or deleting information necessary for initiating a communication in a global communication group to which entities distributed in the at least two systems are affiliated, the method especially including directly transmitting, between a participating server managing the client entity initiating the communication and a non-controlling server of the global communication group, an invite message according to the SIP protocol. Furthermore, some information is added in the different transmissions in order to allow additional checks by the different entities.

9 Claims, 7 Drawing Sheets

(56) References Cited

OTHER PUBLICATIONS

3rd Generation Partnership Project; Technical Specification Group Radio Access Network; Mission Critical (MC) services over LTE; Part 1 : Common test environment (Release 15), 3GPP Draft; 36579-I-F30, 3rd Generation Partnership Project (3GPP), Mobile Competence Centre; Oct. 2021, XP052059641, Retrieved from the Internet: URL:https://ftp.3gpp.org/tsg_ran/WG5_Test_exTI/Working_documents/draft_specs_with_CRs_implemented/after_RAN5-92/clean/36579-1-f30.zip 36579-1-£30.docx, [retrieved on Oct. 6, 2021], 484 pages.

* cited by examiner

METHOD FOR INITIATING COMMUNICATION WITHIN A REGROUP OF COMMUNICATION GROUPS IN A 3GPP MCS NETWORK

CROSS-REFERENCE TO RELATED APPLICATIONS

This application claims priority to French Patent Application No. 2114662, filed Dec. 30, 2021, the entire content of which is incorporated herein by reference in its entirety.

FIELD

The technical field of the invention is that of telecommunications.

The present invention relates to a method for initiating a call within a regroup of communication groups in a 3GPP MCS network, and in particular in the case of communication groups distributed in several systems interconnected via gateways.

BACKGROUND

The PMR (Professional Mobile Radio) standards TETRAPOL®, TETRA® or P25® enable the implementation of secure professional networks. These narrowband networks are national or local networks: they are implemented for example within an organisation such as a company, within a country for example for the communications of firefighters, the police, the military etc.

These networks are evolving to support broadband exchanges. The 3GPP standard governing mobile networks of the "GSM" type, and more particularly in deployments involving critical communication services defined by the 3GPP, called "MCS" or "Mission Critical Services", enables these secure broadband exchanges.

Figure 1:
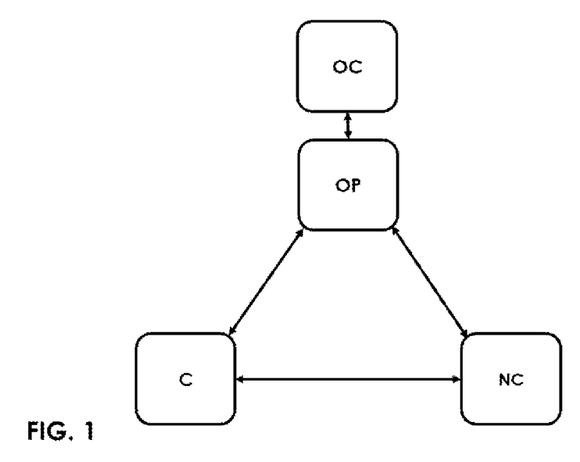
FIG. 1 shows a schematic representation of a network according to the 3GPP MCS standard.

Such a network is for example represented in FIG. 1. This network comprises an Originating Client (OC) connected to an Originating Participating Server (OP). The participating server OP can communicate with other servers in the network. In FIG. 1, the participating server OP can communicate with a controlling C server and a non-controlling server. The participating OP, controlling C and non-controlling NC servers are "MCX servers" as defined in 3GPP MCS.

The non-controlling NC server and the controlling C server may also communicate with each other. The participating server OP is a server that is in charge of managing the originating client OC. The controlling C server is in charge of managing a communication group within which the originating client OC desires to communicate. The non-controlling NC server can be seen as a sub-server of the communication group within which the originating client OC desires to communicate and is in charge of managing one of the "constituent" groups of a regroup of communications groups.

By "3GPP MCS standard communication network", it is meant a communication network compatible with the 3GPP MCS standard and more particularly with the current version of 3GPP which is version 17, with the previous versions from version 13 onwards and with the following versions incorporating all the characteristics of the invention.

Figure 2:
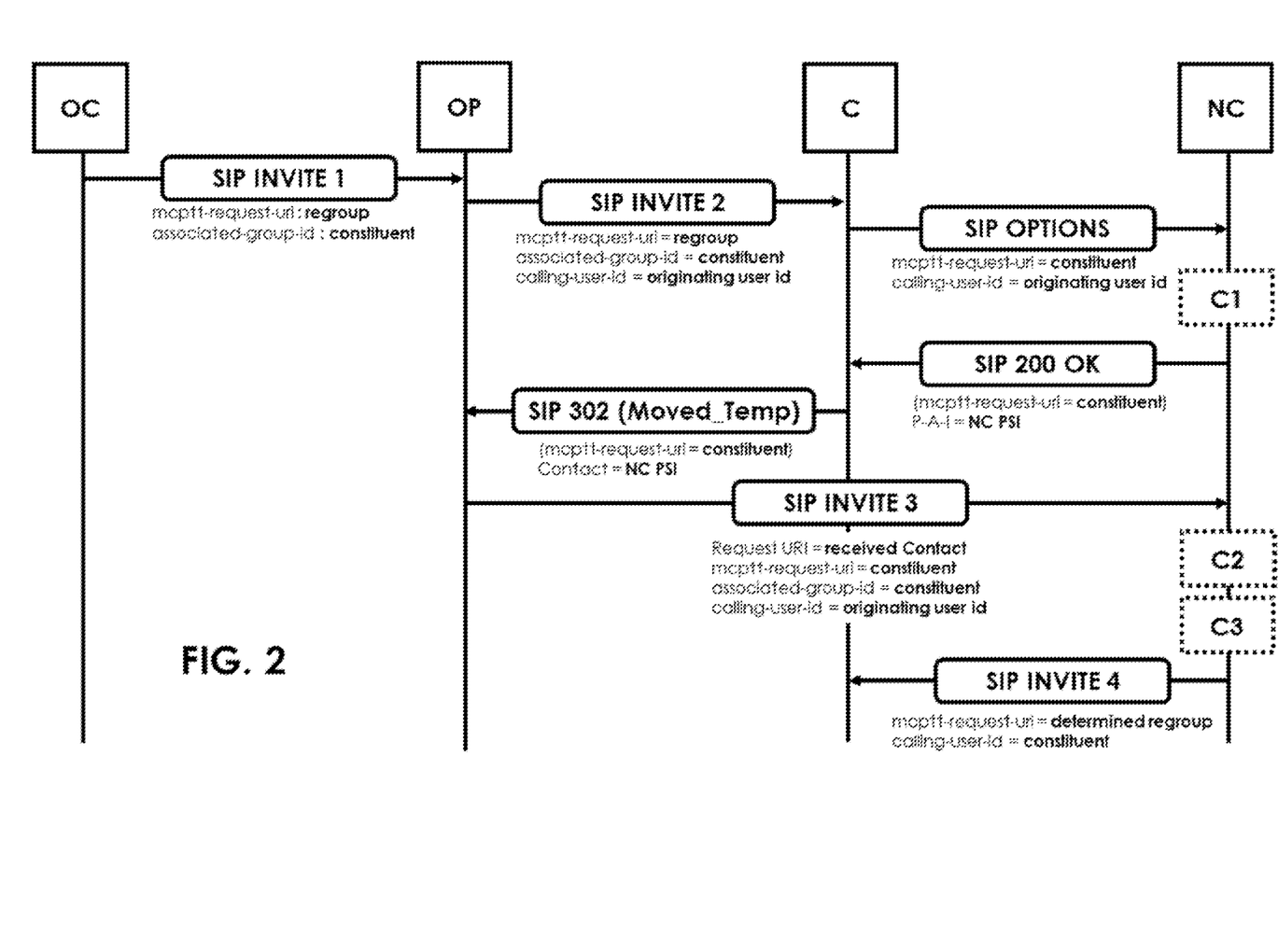
FIG. 2 shows a schematic representation of a method for initiating communication within a regroup of communication groups according to the 3GPP MCS standard.

When the originating client OC desires to initiate a call in a global group GA regrouping a communication group G1 to which the client OC belongs and a communication group G2 to which the client OC does not belong, a call initiation procedure within a regroup of communication groups according to the 3GPP MCS standard is implemented. Such a procedure is represented in FIG. 2 and the latest version of the procedure is defined in Technical Specification 24.379 version 17.5.0. This procedure is applicable for both communication groups resulting from regrouping communication groups, or for temporary communication groups.

As shown in FIG. 2, the originating client OC sends a "SIP INVITE 1" message to the participating server OP of its communication group G1. SIP is a Session Initiation Protocol. The SIP INVITE message, defined by RFC 3261, is a message inviting another client to participate in a session. In the context of the 3GPP MCS standard, this message comprises a <mcptt-request-uri> field indicating to the recipient server, that is, the participating server OP, the regroup global group ("regroup") within which the originating client OC desires to initiate a communication, that is, the global group GA in this example.

The SIP INVITE 1 also comprises a <associated-group-id> field indicating to which communication group included in the global group GA the OC client belongs. In the present example, the group G1 of the originating client OC included in the global group GA is called "constituent", so called because it is one of the two groups "constituting" the global group GA.

The participating server OP receives the SIP INVITE 1 message and sends a SIP INVITE 2 message to the controlling server of the global group GA regrouping the groups G1 and G2. The SIP INVITE 2 message comprises the same fields filled in the same way as the SIP INVITE 1 message and further comprises a "calling-user-id" field indicating the identifier of the originating user, that is, the originating client OC. In practice, the participating server OP does not distinguish between the SIP INVITE message for a normal group or for a regroup/temporary group, and transmits the SIP INVITE 2 message to the Controlling server of the global group GA, based on the <mcptt-request-uri> element, as for a normal group, ignoring the <associated-group-id> element.

The controlling C server of the global group GA receives the SIP INVITE 2 message and then sends a SIP OPTIONS message to the non-controlling NC server of the constituent group identified in the <associated-group-id> field of the received SIP INVITE 2 message, that is, to the non-controlling NC server of the group G1, to check whether the originating client OC is allowed to initiate the call. In one alternative, the <associated-group-id> field may be omitted and the controlling C server sends the SIP OPTIONS message to all non-controlling NC servers of the groups constituting the global group GA.

The SIP OPTIONS message, defined by RFC 3261, is a message that enables one network entity to know the capacities of another network entity.

In the procedure set forth here, the SIP OPTIONS message comprises a <mcptt-request-uri> field indicating the identity of the constituent group "constituent" from the <associated-group-id> field of the SIP INVITE 2, in this case the group G1 to which the originating client OC belongs. The SIP OPTIONS message also comprises a <calling-user-id> field comprising the identifier of the originating client OC "originating user id".

The non-controlling NC server of the group G1 receiving this SIP OPTIONS message then implements a procedure C1 to check that the originating client OC is a member of the received constituent group (here G1) and that it is allowed to launch a pre-arranged group session ("pre-arranged") or in chat mode, and returns a response in the form of a SIP 200 message indicating that the request is successful, to the controlling C server, with a header field <P-Asserted-Identity> defined on the PSI (Public Service Identity) of the non-controlling NC server.

The controlling C server uses the information in the SIP 200 response to send back a SIP 302 response "Moved Temporarily" to the originating participating server OP. The SIP 302 response comprises the identity of the constituent group in the <mcptt-request-uri> element, and the PSI of the non-controlling C server in a <contact> header field, copied from the <P-Asserted-Identity> field of the received SIP 200 message.

The originating participating server OP uses the information in the received SIP 302 message and forwards the SIP INVITE, via a SIP INVITE 3 message to the non-controlling NC server, using the PSI received in the <contact> field and the constituent group identity received in the <mcptt-request-uri> field of the SIP 302 response. This SIP INVITE 3 message thus comprises the following fields:
- <Request URI>=received Contact, indicating the PSI of the non-controlling NC server,
- <mcptt-request-uri>=constituent, indicating the identity of the constituent group
- <associated-group-id>=constituent, indicating the identity of the constituent group
- <calling-user-id>=originating user id, indicating the identity of the originating client OC The non-controlling NC server then re-checks that the originating client OC is allowed to initiate a pre-established group session in a procedure C2 and determines, in a procedure C3, which is the regroup group or temporary group into which the constituent group (received in the <mcptt-request-uri> element from the originating participating OP) has been regrouped and sends a SIP INVITE 4 invite to the controlling C server of the regroup group, here the global group GA.

Figure 3:
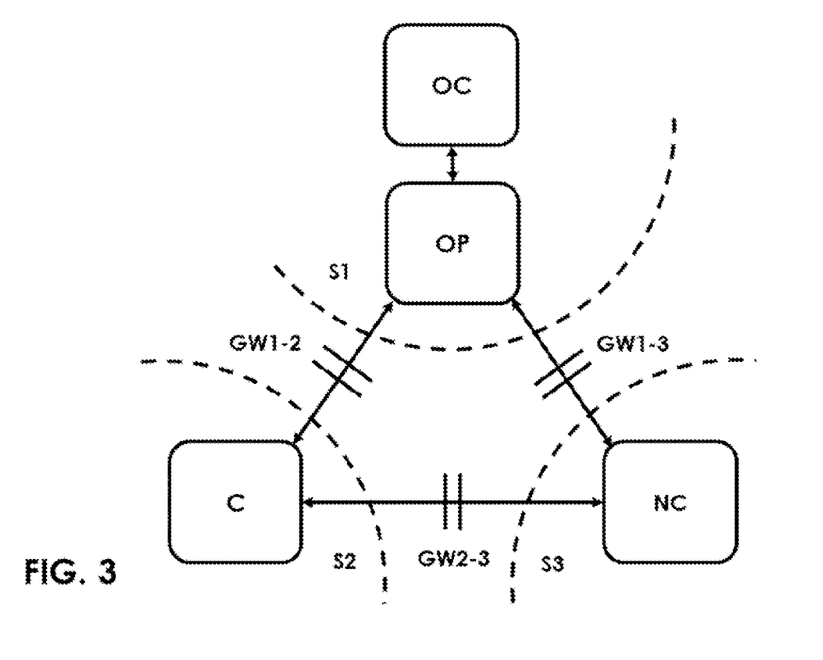
FIG. 3 shows a schematic representation of a network according to the 3GPP MCS standard formed of several interconnected systems.

In this procedure, problems arise when entities are included in different interconnected systems, for example in systems of different nationalities or organisations. Sometimes it then becomes impossible for these entities to communicate with each other. To illustrate this problem, a communication network according to the 3GPP MCS standard is schematically represented in FIG. 3. Such an architecture is described for example in the technical specifications TS23.280 v17.8.0 and TS24.379 V17.4.0, section 5.5 of the 3GPP MCS standard.

The communication systems S1, S2 and S3 represented in FIG. 1 form a network according to the 3GPP MCS standard. The system S1 comprises for example the originating client OC and the originating participating server OP.

For confidentiality purposes, gateways are required. The gateways GW1-2, GW1-3 and GW2-3 are located between the systems S1 and S2, S1 and S3 and S2 and S3 respectively. To illustrate a problem that occurs due to the presence of these gateways, the method for initiating a call in a regroup of communication groups in FIG. 2 will be described in the presence of these gateways.

Figure 4:
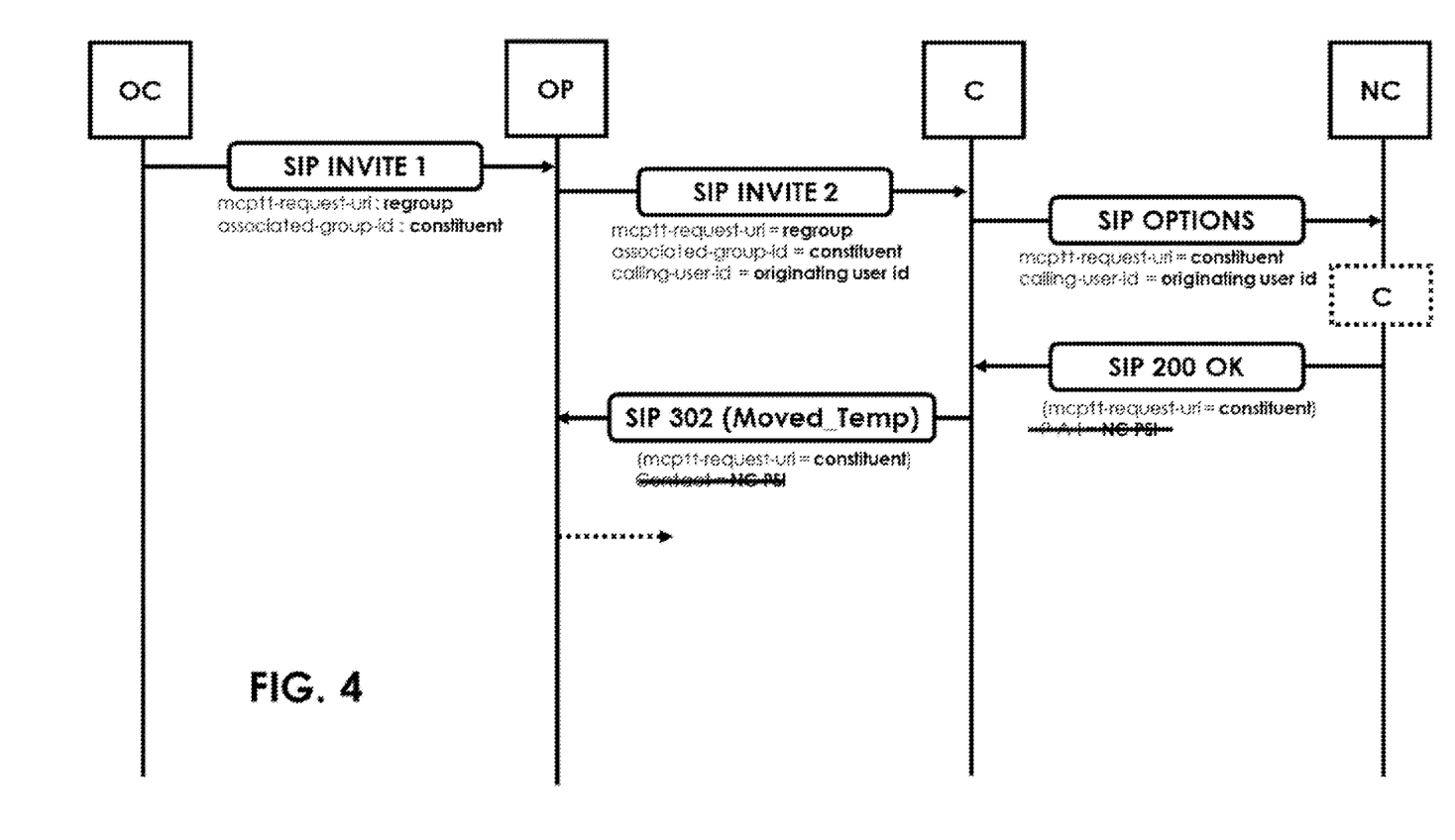
FIG. 4 shows a schematic representation of a method for initiating communication within a regroup of communication groups according to the 3GPP MCS standard consisting of several interconnected systems.

A method for initiating 3GPP MCS standard regroup of communication groups in a network comprising systems interconnected via gateways is schematically represented in FIG. 4.

The task of the gateways GW1-2, GW1-3 and GW2-3 is to preserve the confidentiality of the various systems S1 to S3. For this, they are configured to delete, modify, hide or replace certain information at the output of the systems. These gateways may be in two parts, for example comprising two gateways: a gateway at the "output" of the system processing information leaving the system and a gateway at the "input" of the system processing information entering the system. These gateways are configured to handle sensitive data, for example an identifier of a client of a system, so that this identifier is not known to the destination system, for example because the originating system does not trust the destination system.

The method for initiating a call in a regroup of groups represented in FIG. 4 is identical to the method in FIG. 2 up to the SIP OPTIONS message sent to the non-controlling NC server, that is, it comprises the same steps of sending the SIP INVITE 1 message, the SIP INVITE 2 message and then the SIP OPTIONS message comprising the same fields as in the method in FIG. 2. Indeed, these steps do not comprise any sensitive information that has to be, or is being, hidden or deleted by the gateways.

When the non-controlling NC server belonging to the system S3 returns the SIP 200 OK response to the SIP OPTIONS message to the controlling C server belonging to the system S2, the gateway GW2-3 replaces the PSI that the non-controlling NC had placed in the header field <P-Asserted-Identity> with its own URI, that is, the URI (Uniform Resource Identifier) of the gateway GW2-3, as the PSI of the non-controlling NC server cannot be exposed to the controlling C server for confidentiality reasons.

Thus, when the controlling C server belonging to the system S2 sends its SIP 302 response to the originating participating server OP belonging to the system S1, the header field <Contact> will contain the URI of the gateway GW2-3 and not the PSI of the non-controlling NC server. The gateway GW1-2 could furthermore consider the URI in the <Contact> header field to be sensitive information and either replace it with its own URI or delete that header field.

The result is that the originating participating server OP will not receive any information in the SIP 302 response that would enable it to correctly route the SIP INVITE 3 to the non-controlling NC server. The information received could be "undetermined" if the <Contact> header field is deleted by the gateway GW1-2, or it could be the URI of the gateway GW1-2, or of the gateway GW2-3 if the <Contact> header field has not been modified by the gateway GW1-2. In any case, the originating participating server OP will not receive the PSI of the non-controlling NC server nor the URI of the gateway GW1-3, which could have enabled it to reach the non-controlling NC server.

Thus, when the different functions of this procedure are performed in different systems in different domains, the state-of-the-art procedure does not enable the SIP INVITE 3 to be correctly routed to the non-controlling NC server via the appropriate gateway, nor even directly if they are in the case where the non-controlling NC server and the originating participating OP server would be in the same system but the regroup group is not. Thus, in the case of such an architecture, provided by the 3GPP MCS standard, it is not possible for an originating client OC to initiate a communication within a regroup of communication groups.

There is therefore a need to provide such a service without the drawbacks mentioned above.

SUMMARY

Various aspects of the invention provide a solution to the previously mentioned problems, by enabling an entity included in a system different from the system in which a controlling server of a regroup of communication groups or a temporary group is included, to initiate a communication within the regroup of communication groups or the temporary group.

An aspect of the invention relates to a method for initiating, by a first client entity, a communication within a global communication group comprising a least a first communication group and a least a second communication group, a least a second client entity being affiliated to the second communication group, the method being implemented in a communication network according to the 3GPP MCS "3rd Generation Partnership Program Mission-Critical System" standard, the network comprising at least:
- the first client entity affiliated to the first communication group,
- an originating participating server managing the first client entity within the first communication group,
- a controlling server being in charge of managing the global communication group,
- at least one non-controlling server of the global communication group being in charge of managing the first communication group, the first client entity and the originating participating server being included in at least a first system, the controlling server being included in a second system, the first and second systems being separated by at least one gateway, the method comprising the steps of:
- Transmitting, by the first client entity to the participating server, a first invite message according to the session initiation protocol SIP, the invite message comprising:
  - at least one header field comprising constituent group information, the constituent group information identifying the communication group to which the first client entity is affiliated, and
  - at least one header field comprising called group information, the called group information identifying the global communication group,
- Selecting, by the participating server, the non-controlling server of the communication group to which the first client entity is affiliated, from the constituent group information, the selected non-controlling server belonging to the group identified by the constituent group information,
- Determining, by the participating server, an identifier of the selected non-controlling server,
- Transmitting, by the participating server to the selected non-controlling server, a second invite message according to the session initiation protocol SIP, the invite message comprising:
  - at least one header field comprising recipient server information, the recipient server information comprising the identifier of the selected non-controlling server, and
  - at least one header field comprising originating user information, the originating user information comprising an identifier of the first client entity,
  - at least one header field comprising the constituent group information,
  - at least one header field comprising the called group information,
- Checking, by the non-controlling server, that the first client entity is allowed to initiate the communication within the global communication group from the originating user information,
- Selecting, by the non-controlling participating server, the controlling server of the global communication group,
- Transmitting, by the non-controlling server to the controlling server, a third invite message according to the session initiation protocol SIP, the invite message comprising:
  - at least one header field comprising the constituent group information,
  - at least one header field comprising the called group information.
- Inviting, by the controlling server of the global communication group, each client entity of the global communication group to participate in the communication from the called group information.

By means of the invention, the initiation method of the 3GPP MCS standard is simplified, while at the same time solving the problems associated with servers included in different systems interconnected via gateways. Indeed, in the method according to the invention and unlike the state of the art, the participating server directly routes the invite message according to the SIP protocol to the non-controlling server of the communication group of the client entity initiating the communication, making it possible to avoid data deletions by the gateways, and to limit the exchanges between servers, making the initiation method faster and more secure.

In addition to the characteristics just discussed in the preceding paragraph, the communication initiation method according to an aspect of the invention may have one or more additional characteristics among the following, considered individually or in any technically possible combination:
- the controlling server is included in a third system, the first and the third system being separated by a second gateway, the second and the third system being separated by a third gateway.
- the checking step is further based on the constituent group information and the called group information.
- the checking step by the non-controlling server further comprises at least checking that the first client entity is indeed affiliated to the first communication group from the constituent group information and the originating user information.
- the checking step by the non-controlling server further comprises at least checking that the first communication group is included in the global communication group from the constituent group information and the called group information.
- the third invite message according to the session initiation protocol SIP further comprises at least one header field comprising the originating user information.
- the step of inviting, by the controlling server of the global communication group, each client entity of the global communication group to participate in the communication based on the called group information comprises at least one header field comprising the originating user information.

Another aspect of the invention relates to a communication network according to the 3GPP MCS "3rd Generation Partnership Program Mission-Critical System" standard, the communication network being formed by at least:
- a first system comprising at least a first client entity and at least one participating server,
- a second system comprising at least one controlling server of a global communication group, the network comprising the global communication group formed by a least a first communication group and a least a second communication group,
- the first client entity being affiliated to the first communication group,
- the originating participating server managing the first client entity within the first communication group,
- the controlling server being in charge of managing the global communication group, at least one non-controlling server of the global communication group included in the network being in charge of managing the first communication group, the first and second systems being separated by at least one gateway, the communication network being configured to implement the communication initiation method according to the invention.

In ae embodiment, the network comprises a third system, the controlling C server included in the third system, the first and third systems being separated by a second gateway, the second and third systems being separated by a third gateway.

The invention and its various applications will be better understood upon reading the following description and upon examining the accompanying figures.

BRIEF DESCRIPTION OF THE FIGURES

The figures are set forth for indicative and in no way limiting purposes of the invention.

DETAILED DESCRIPTION

Unless otherwise specified, a same element appearing in different figures has a unique reference.

Figure 5:
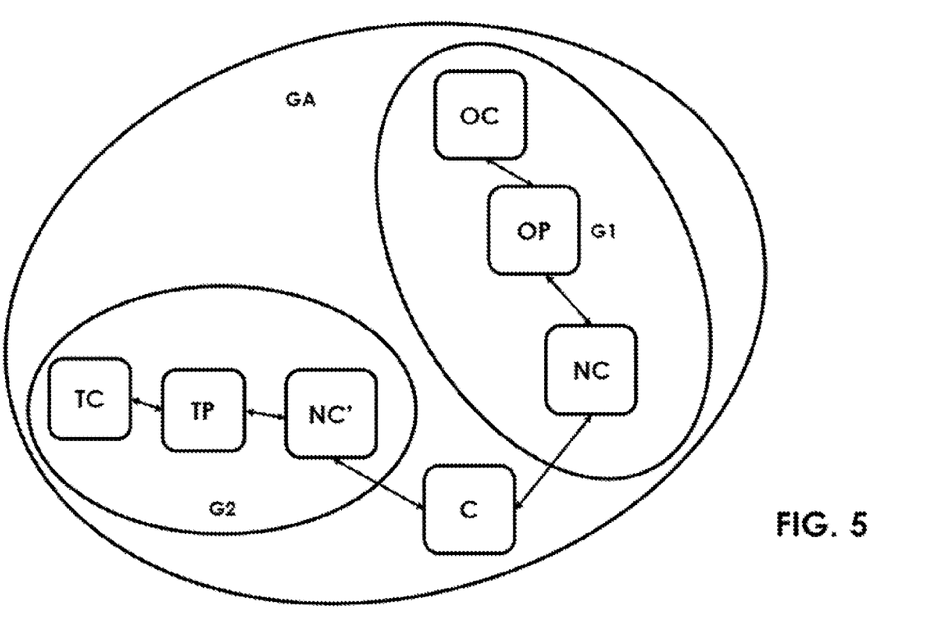
FIG. 5 shows a schematic representation of a network comprising a regroup of communication groups according to the invention.
Figure 6:
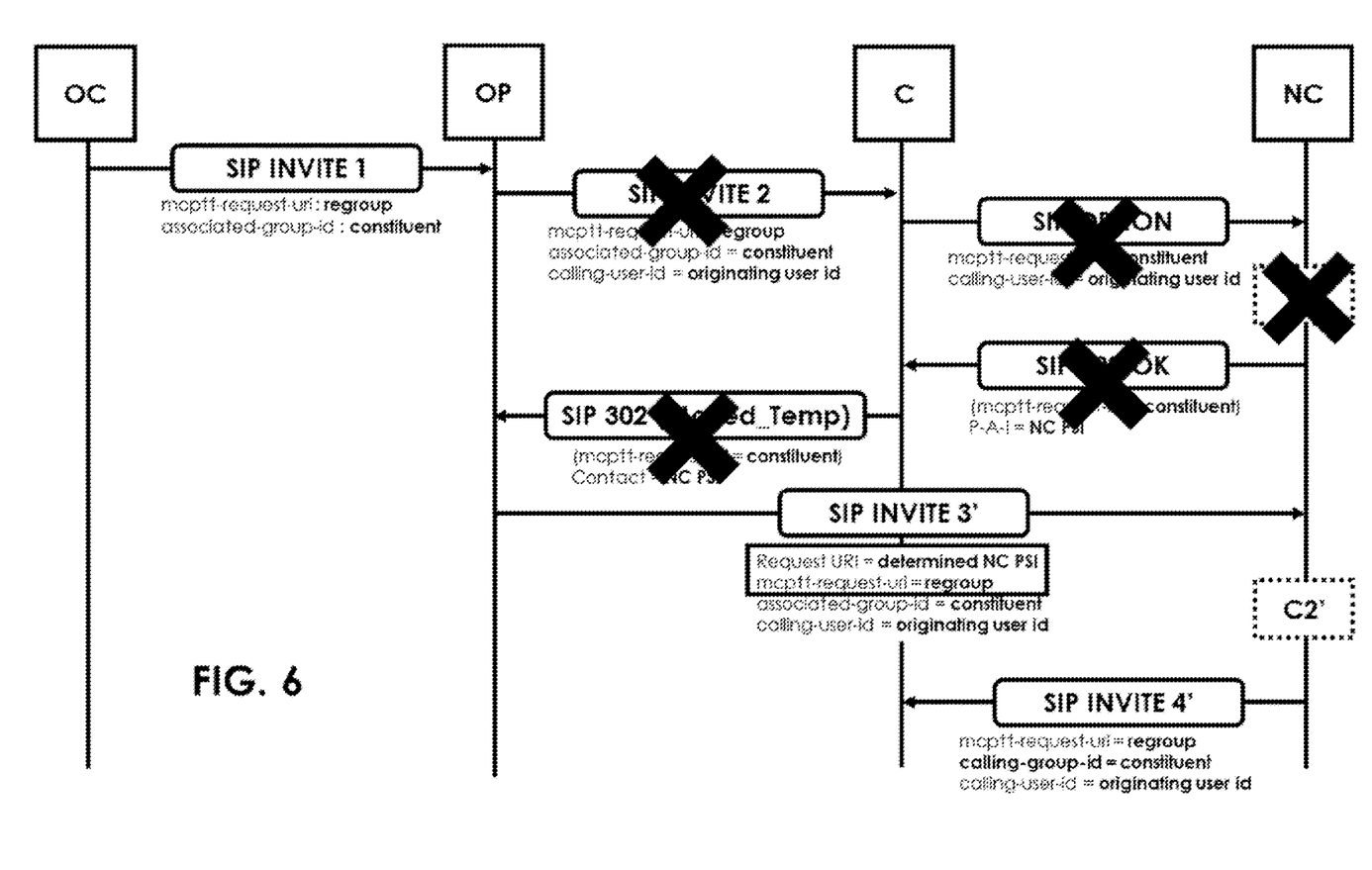
FIG. 6 shows a schematic representation of a communication initiation method according to the invention.
Figure 7:
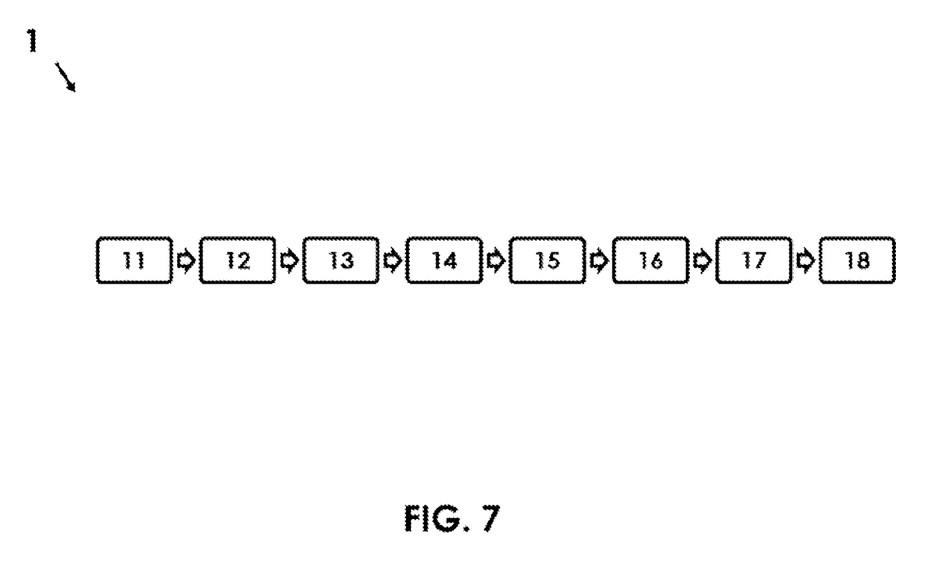
FIG. 7 shows a further schematic representation of a communication initiation method according to the invention.

FIGS. 6 and 7 each show a schematic representation of the method according to the invention. FIGS. 6 and 7 show a different representation of the same method according to the invention. The method according to the invention is implemented by the network represented in FIG. 5.

The method represented in FIGS. 6 and 7 is a method for initiating communication according to the invention within a regroup of communication groups.

The network represented in FIG. 5 configured to implement the method according to an aspect of the invention is a network according to the 3GPP MCS standard, that is, it is implemented following the specifications defined by the 3GPP MCS standard.

The network of FIG. 5 comprises a global communication group GA regrouping two communication groups G1 and G2. A client entity OC is affiliated to the communication group G1. A participating server OP manages the client entity OC within the communication group G1 and a non-controlling NC server of the global communication group is in charge of managing the communication group G1. A second non-controlling NC' server is in charge of managing the second communication group G2. A controlling C server is in charge of managing the global communication group GA. An aspect of the invention also covers the alternatives in which the controlling C server of the global communication group GA is in charge of managing the communication group G1 or managing the communication group G2. The second non-controlling NC' server is connected to the controlling C server. A terminal participating server TP is connected to the second non-controlling NC' server and to a second terminal client entity TC, the terminal participating server TP being in charge of managing the second terminal client entity TC, the second terminal client entity TC being affiliated to the communication group G2. The different servers describe herein may each include one or more processors and one or more non-transitory memories coded with instructions to carry out the respective functions of the servers. The servers may also include one or more input and output communication ports.

In FIG. 5, the systems interconnected via gateways are not represented for clarity. The gateways GW1-2, GW1-3 and GW2-3 are also not represented for clarity.

The network of FIG. 5 comprises at least a first and a second system interconnected via at least one gateway, for example in the same way as represented in FIG. 3. The first system S1 comprises at least the client entity OC and the participating server OP. The second system S2 comprises at least the controlling C server of the global communication group GA.

The non-controlling NC server may comprise each of the first and second systems, or may comprise a third system, as represented in FIG. 3.

Aspects of the invention cover any network according to the 3GPP MCS standard comprising at least two systems separated by a gateway hiding or deleting information necessary for initiating a communication in a global communication group to which entities distributed in the at least two systems are affiliated.

The method 1 according to the invention represented in FIGS. 6 and 7 enables the originating client entity OC to initiate a communication within the global communication group GA, that is, a communication with at least one other client entity of the global communication group GA, for example with the second client entity C' member of one of the constituent groups regrouped in the global group GA. This communication may be a pre-arranged or chat type communication. A mobile terminal (e.g. a phone or a computer) may be representative of a client entity.

The communication initiation method 1 according to an embodiment of the invention comprises a first step 11, identical to the first step of the method for initiating a communication within a regroup of communication groups of prior art. In this first step 31, the first client entity OC desiring to initiate a communication transmits, to the participating server OP, a first invite message according to the session initiation protocol SIP. An invite message according to the SIP protocol is a "SIP INVITE" type message.

The SIP INVITE 1 message of step 11 comprises at least one header field comprising constituent group information, the constituent group information identifying the communication group G1 to which the first client entity OC is affiliated. For this, the SIP INVITE message comprises an associated group identifier field named <associated-group-id> defined in the 3GPP MCS standard and taking a value "constituent" indicating the constituent group of the global communication group to which the client entity OC initiating the communication is affiliated.

The SIP INVITE 1 message of step 11 further comprises at least one header field comprising called group information, the called group information identifying the global communication group GA. For this, the SIP INVITE 1 message comprises a MCPTT (Mission Critical Push To Talk) request field named <mcptt-request-uri> defined in the 3GPP MCS standard and taking a value "regroup" indicating the global communication group GA within which the client entity OC desires to initiate a communication.

The method 1 according to an embodiment of the invention comprises a second step 12 implemented by the participating server OP. The participating server OP is a server belonging to the same communication group G1 as the client entity OC and managing the client entity OC within this communication group G1. The second step 12 implemented by the participating entity OP is a step of selecting the non-controlling NC server of the communication group G1 to which the first client entity OC is affiliated. Indeed, an aspect of the invention is based especially on the fact that the participating entity OP has sufficient information to directly select this non-controlling NC server. This selection is carried out by the server from the constituent group information identifying the group G1 received in the SIP INVITE 1 message, the selected non-controlling NC server belonging to the group G1 identified by the constituent group information. By means of this information, the participating server OP can directly route the received SIP INVITE 1 message to the non-controlling NC server via the PSI of the non-controlling NC server if the non-controlling NC server is in the same system as the participating server OP, or via at least one gateway if the non-controlling NC server is located in another system. Indeed, in such a case, the gateway can modify the PSI of the participating server OP, which does not disturb the communication initiation method 1 according to the invention. Indeed, in the invention, the PSI of the participating server OP is not used afterwards and the communication is still established, unlike the state of the art.

The method 1 according to an embodiment of the invention then comprises a step 13 of determining, by the participating server OP, an identifier of the selected non-controlling NC server. This is made possible by the fact that the participating server OP knows the identity of the non-controlling NC server in charge of managing the constituent group G1 of the global communication group GA. Indeed, the client entity OC is affiliated to the communication group G1. If the communication group G1 is not regrouped in the global group GA, then the client entity OC can establish a "simple" call to the communication group G1, which the participating server OP then necessarily knows to route to the controlling server of the group G1. If the group G1 is regrouped in the global group GA, the non-controlling NC server to be reached is the server in charge of managing the constituent group G1, which is none other than the non-controlling NC server then taking a non-controlling role NC.

After determining the identifier of the selected non-controlling NC server, the participating server OP transmits in a step 14, to the selected non-controlling NC server, a SIP INVITE 3' invite message according to the session initiation protocol SIP. This message will be called "second invite message" because it is the second invite message of the protocol 1 according to the invention.

The second SIP INVITE 3' invite message comprises at least one header field comprising recipient server information, the recipient server information comprising the identifier of the selected non-controlling NC server. For this, the field is of <Request URI> type defined by the 3GPP MCS standard and may take a value "determined NC PSI" indicating the PSI determined in step 13 of the non-controlling NC server selected in step 12.

The second SIP INVITE 3' invite message also comprises at least one header field comprising originating user information, the originating user information comprising an identifier of the first client entity OC. For this, the SIP INVITE 3' message comprises a <calling-user-id> field defined in the 3GPP MCS standard and taking a value indicating an identifier of the client entity OC.

In another embodiment of the invention, the second SIP INVITE 3' invite message further comprises:
  at least one header field comprising the constituent group information, for example the same <associated-group-id> header field as the first SIP INVITE 1 invite message,
  at least one header field comprising the called group information, for example the same <mcptt-request-uri> header field as the first SIP INVITE 1 invite message.

This then enables the non-controlling NC server to check the consistency of the request from the client entity OC and to check that the global group GA within which the client entity OC desires to initiate a communication does indeed comprise the communication group G1 to which the client entity OC is affiliated, as will be described later.

The method 1 according to an embodiment of the invention then comprises a step 15 of checking, by the non-controlling NC server, that the first client entity OC is allowed to initiate the communication within the global communication group GA from the originating user information received in the second SIP INVITE 3' invite message from the participating server OP. This is also represented in FIG. 6 by the box "C2'".

In the other embodiment, that is, in the embodiment in which the second SIP INVITE 3' invite message comprises a header field comprising the constituent group information and a header field comprising the originating user information, the non-controlling NC server checks at the checking step 15, from these two pieces of information, that the first client entity OC is indeed affiliated to the first communication group G1. Indeed, the non-controlling NC server is the server in charge of managing the communication group G1. As such, it manages the users' affiliations to this group G1.

In one alternative to this same other embodiment, compatible with the check that the first client entity OC is indeed affiliated to the first communication group G1, the non-controlling NC server checks at checking step 15, that the first communication group G1 is indeed included in the global communication group GA from the constituent group information and the called group information. This ensures that the client entity will not initiate a communication in a regroup group that has changed since step 11. Such a check is not performed in prior art, which may lead to the originating client entity OC communicating within a regroup of groups within which it did not desire to communicate.

The method 1 then comprises a step 16 of selecting, by the non-controlling participating NC server, the controlling C server of the global communication group GA. This selection is carried out especially from the called group information, identifying the global communication group GA. As the non-controlling NC server manages the first communication group G1, it knows that the first communication group G1 is regrouped into a global communication group GA and has knowledge of the controlling C server of this global communication group GA.

The method 1 then comprises a step 17 of transmitting, by the non-controlling NC server to the controlling C server of the global communication group GA, a third SIP INVITE 4' invite message according to the session initiation protocol SIP. This third SIP INVITE 4' invite message comprises:

at least one header field comprising the constituent group information, for example the same <associated-group-id> header field as the first SIP INVITE 1 invite message and the second SIP INVITE 3' invite message, at least one header field comprising the called group information, for example the same header field <mcptt-request-uri> as the first SIP INVITE 1 invite message and the second SIP INVITE 3' invite message.

In the other embodiment, that is, in the embodiment in which the second SIP INVITE 3' invite message comprises a header field comprising the constituent group information and a header field comprising the originating user information, the third SIP INVITE 4' invite message further comprises at least one header field comprising the originating user information. This subsequently enables the controlling C server to include the identifier of the originating client entity OC in the invite to participate in the communication, and thus the other client entities participating in the communication to have the identity of the originating client entity OC. This especially enables the other client entities participating in the communication to know with whom they are communicating. This also enables the controlling C server to include the identity of the Granted party in a "Floor taken" message, if an implicit request for obtaining the floor is used.

The method 1 according to an embodiment of the invention comprises a last step 18, not represented in FIG. 6, of inviting, by the controlling C server of the global communication group GA, each client entity of the global communication group GA to participate in the communication. This invite is based on the identifier of the global communication group GA received in the called group information.

In the other embodiment, that is, in the embodiment in which the second SIP INVITE 3' invite message comprises a header field comprising the constituent group information and a header field comprising the originating user information and in which the third SIP INVITE 4' invite message further comprises at least one header field comprising the originating user information, the invite message at the inviting step 18 comprises at least one header field comprising the originating user information, so that they are aware of the identity of the originating client entity OC that initiated the communication within the global communication group OC.

Embodiments of the subject matter and the operations and the various elements (server, gateway, . . . ) described in this specification can be implemented in digital electronic circuitry, and/or in computer software, and/or firmware, or and/or hardware, including the structures disclosed in this specification and their structural equivalents, or in combinations of one or more of them. Embodiments of the subject matter described in this specification can be implemented, e.g., as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. The different characteristics described and/or claimed may be beneficially combined. Their presence in the description or in the different dependent claims do not exclude this possibility. The reference signs cannot be s understood as limiting the scope of the invention.

The invention claimed is:

1. A method for initiating, by a first client entity, a communication within a global communication group comprising a least a first communication group and a least a second communication group, a least a second client entity being affiliated to the second communication group, the method being implemented in a communication network according to the 3GPP MCS 3rd Generation Partnership Program Mission-Critical System standard, the network including
  the first client entity affiliated to the first communication group,
  an originating participating server managing the first client entity within the first communication group,
  a controlling server being in charge of managing the global communication group,
  at least one non-controlling server of the global communication group being in charge of managing the first communication group,
the first client entity and the originating participating server being included in at least a first system, the controlling server being included in a second system, the first and second systems being separated by at least one gateway, the method comprising:
  transmitting, by the first client entity to the participating server, a first invite message according to the session initiation protocol SIP, the invite message comprising:
    at least one header field comprising constituent group information, the constituent group information identifying the communication group to which the first client entity is affiliated, and
    at least one header field comprising called group information, the called group information identifying the global communication group,
  selecting, by the participating server, the non-controlling server of the communication group to which the first client entity is affiliated, from the constituent group information, the selected non-controlling server belonging to the group identified by the constituent group information,
  determining, by the participating server, an identifier of the selected non-controlling server,
  transmitting, by the participating server, to the selected non-controlling server, a second invite message according to the session initiation protocol SIP, the invite message comprising:
    at least one header field comprising recipient server information, the recipient server information comprising the identifier of the selected non-controlling server, and
    at least one header field comprising originating user information, the originating user information comprising an identifier of the first client entity,
    at least one header field comprising the constituent group information,
    at least one header field comprising the called group information,
  checking, by the non-controlling server, that the first client entity is allowed to initiate the communication within the global communication group from the originating user information,
  selecting, by the non-controlling participating server, the controlling server of the global communication group,
  transmitting, by the non-controlling server to the controlling server, a third invite message according to the session initiation protocol SIP, the invite message comprising:
    at least one header field comprising the constituent group information,
    at least one header field comprising the called group information, and
  inviting, by the controlling server of the global communication group, each client entity of the global communication group to participate in the communication from the called group information.

2. The method according to claim 1, wherein the controlling server is included in a third system, the first and third systems being separated by a second gateway, the second and third systems being separated by a third gateway.

3. The method according to claim 1, wherein the checking is further based on the constituent group information and the called group information.

4. The method according to claim 3, wherein the checking by the non-controlling server further comprises at least checking that the first client entity is affiliated to the first communication group from the constituent group information and the originating user information.

5. The method according to claim 3, wherein the checking by the non-controlling server further comprises at least checking that the first communication group is included in the global communication group from the constituent group information and the called group information.

6. The method according to claim 1, wherein the third invite message according to the session initiation protocol SIP further comprises at least one header field comprising the originating user information.

7. The method according to claim 6, wherein the inviting by the controlling server of the global communication group, each client entity of the global communication group to participate in the communication from the called group information comprises at least one header field comprising the originating user information.

8. A communication network according to the 3GPP MCS 3rd Generation Partnership Program Mission-Critical System standard, the communication network being formed by at least:
  a first system comprising at least a first client entity and at least one participating server,
  a second system comprising at least one controlling server of a global communication group,
  the network comprising the global communication group formed by a least a first communication group and a least a second communication group,
    the first client entity being affiliated to the first communication group,
    the originating participating server managing the first client entity within the first communication group,
    the controlling server being adapted to manage the global communication group,
    at least one non-controlling server of the global communication group included in the network being adapted to manage the first communication group,
the first and second systems being separated by at least one gateway, the communication network being configured to implement the communication initiation method according to any of the preceding claims.

9. The network according to claim 8, further comprising a third system, the controlling server being included in the third system, the first and third systems being separated by a second gateway, the second and third systems being separated by a third gateway.

* * * * *